(12) United States Patent
Damola et al.

(10) Patent No.: US 8,671,440 B2
(45) Date of Patent: Mar. 11, 2014

(54) PERSONALIZED INTERACTION USING CODES

(75) Inventors: Ayodele Damola, Solna (SE); Elena Fersman, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 755 days.

(21) Appl. No.: 12/530,355

(22) PCT Filed: Feb. 5, 2008

(86) PCT No.: PCT/SE2008/050141
§ 371 (c)(1),
(2), (4) Date: Mar. 3, 2010

(87) PCT Pub. No.: WO2008/108718
PCT Pub. Date: Sep. 12, 2008

(65) Prior Publication Data
US 2010/0154035 A1  Jun. 17, 2010

(30) Foreign Application Priority Data
Mar. 6, 2007 (JP) .................................. 2007-056345

(51) Int. Cl.
*G06F 21/00* (2013.01)
(52) U.S. Cl.
USPC .................. 726/4; 726/9; 713/186; 709/223; 709/224; 455/419; 455/435
(58) Field of Classification Search
USPC .......................................................... 726/4
See application file for complete search history.

(56) References Cited

U.S. PATENT DOCUMENTS

| | | | |
|---|---|---|---|
| 6,530,025 B1* | 3/2003 | Nakagawa et al. | 726/4 |
| 7,751,810 B1* | 7/2010 | Bernoske et al. | 455/419 |
| 2003/0050062 A1* | 3/2003 | Chen et al. | 455/435 |
| 2003/0093507 A1* | 5/2003 | Shapiro | 709/222 |
| 2004/0148253 A1* | 7/2004 | Shin et al. | 705/39 |
| 2006/0123078 A1* | 6/2006 | Mendiola et al. | 709/203 |
| 2006/0149635 A1* | 7/2006 | Bhatti et al. | 705/23 |
| 2007/0067311 A1* | 3/2007 | Takai et al. | 707/10 |
| 2007/0180485 A1* | 8/2007 | Dua | 725/114 |

FOREIGN PATENT DOCUMENTS

JP     2005-31780 A    2/2005
WO   WO 2007/018202 A1   2/2007

* cited by examiner

*Primary Examiner* — Morshed Mehedi

(57) ABSTRACT

A method and nodes adapted to provide personalized multimedia services for users having registered a media player (300, 400, 401, 501, 502, 606) to a multimedia network, on the basis of the content (301, 500) read by a code reader (302, 405, 503), connected to or integrated with the media player. Content decoded from a code is used for creating or updating a user preference data record (700, 701) linked to by the identity with which the respective media player is registered. An application server (305, 402, 506, 600) being responsible for personalizing a requested service is interconnected with one or more preference databases (306, 407, 603), and one or more content databases (308, 408, 605) and/or dedicated servers (507). Upon receiving a service request, the application server, access relevant data from the mentioned nodes and assembles personalization instructions, adapted to trigger the requested personalized service in the requesting media player.

24 Claims, 6 Drawing Sheets

US 8,671,440 B2

PERSONALIZED INTERACTION USING CODES

TECHNICAL FIELD

The present invention relates generally to the field of personalizing a service in a multimedia network and specifically to personalization on the basis of information read from a code.

BACKGROUND

Personalization, interactivity, combined services and fixed-mobile convergence can be achieved in several ways, but to succeed in the development of new services and in achieving interoperability between technologies, the industry must agree on an approach that is based on open standards and interfaces. One of the most promising approaches is to use the IP Multimedia Subsystem (IMS) framework. IMS was originally designed to enable multimedia services for third-generation mobile terminals, but it has already been extended to handle access also from public Wireless Local Area Networks (WLAN) and Private Networks, and is continuing to be extended into an access-independent platform for service delivery, including broadband fixed-line access. IMS provides seamless roaming between mobile, public WLAN and private networks for a wide range of services, such as gaming and interactive IP television (IPTV) and devices, such as set-top boxes, multimedia players and digital cameras.

The ability of IMS to deliver combined services enables a seamless integration of TV, communication, and internet services to create a more convenient and attractive experience to the consumers. IMS-based IPTV also inherits all the capabilities of IMS for service roaming, thus linking the IPTV experience to a user profile, not limited to a particular device, as with traditional set-top-boxes. An IPTV service can therefore be delivered to any device adapted with an IMS interface and located within the range of the IMS domain.

Consumers want greater control over TV services and delivered content anytime, anywhere, and on any device. Personalization will enable them to customize TV and Video-on-Demand (VoD) packages according to individual preferences, and to exert greater control over the channel content. The increasing popularity of SMS-based voting and chat services in TV programs also points to strong business opportunities in the area of interactive services.

IMS-enabled IPTV uses the Session Initiation Protocol (SIP), which provides a unified control scheme that can be used to control all types of media sessions as well as application services. It thus supports combined services and interactivity by joining different communications paradigms into a complete multimedia user experience.

The QR-code (Quick Response Code) is a matrix code, or two-dimensional bar code, which was created with the purpose of deriving a code which allowed its contents to be decoded at high speed. QR-codes are now used for inventory management in a wide variety of industries and has become the most popular type of two dimensional codes in Japan. Although initially used for tracking parts in vehicle manufacturing, the inclusion of the QR-Code as a reading software on camera phones in Japan, has led to a wide variety of new, consumer-oriented applications, aimed at relieving the user of the tedious task of entering data into their mobile phone. QR-codes storing addresses and URLs are becoming increasingly common in magazines and advertisements in Japan. The addition of QR-codes on business cards is also becoming common, greatly simplifying the task of entering the personal details of a new acquaintance into the address book of a users mobile phone. Consumers with capture programs and a PC with an RS-232C-interface may use a scanner to acquire data from a QR-code.

A user may build a personal profile by registering (bookmarking) products which are of interest. To bookmark a product, the user registers a code attached to the product by way of scanning a QR-code or, alternatively, by reading an RFID tag, colorcode or matrix code etc, and stores an associated product identity. Information related to the product may be stored in a database and/or on a media player, such as, e.g., a Network Personal Video Recorder (NPVR). If such information comprises personalized advertisements, these may be viewed on, e.g., a TV, PC or a mobile device on a later occasion according to personal preferences.

One way of delivering personalized advertisements, which is applied in many of the commercial systems available today, is based on analysis of data entered by a user. Personalized advertising brings more value both for the user and for the content provider. In existing technology the personalization of the delivered content is based on previous searches that the user has performed, or on messages written earlier. The fact that this information is stored may also be transparent to the user.

A three-dimensional code system that integrates both online and offline, and analog, as well as digital components is based on the use of colorcodes. In this system a camera recognizes indexed codes, comprising specific data. A matrix of blocks and analog data pertaining to the number of colors are digitized and processed by a dedicated server, using unique addresses registered for each of the codes. A typical colorcode interaction flow starts with the authentication of a colorcode by a media player. A number associated with the colorcode is then transferred to a server. Finally, content or a set of actions represented by the colorcode, and associated with the number are transferred to the media player for further processing.

FIG. 1 illustrates an IMS-based IPTV architecture which provides combined services and fixed-mobile convergence. Although specified for IPTV services, a similar architecture could be used for other interactive services as well, which are accessed via a common IMS system. The architecture of FIG. 1 includes an IMS Client environment 100, IMS application servers 101, a common IMS system 102, a transport layer 103 and a Service Delivery Platform (SDP) 104. The Service Delivery Platform offers a standardized set of support functions that can be shared among various service components.

The main functional blocks in the IMS client environment are the IPTV applications 105, other applications 106, such as combinational IMS services, the media client 107, the SIP client 108.

In the client environment, the IPTV applications are responsible for all interactions between IPTV services and users on their media players 110, for instance a set-top box/TV, PC or cellular telephone. Each media player also hosts a media client, which receives and decodes the video and audio streams that make up the digital TV signals, and a SIP client which provides the control interface to the IMS core.

Depending on the application, media players will be required to support specific hardware 111, such as a camera, a scanner or a microphone, which may be attached to, or integrated with the media player.

The IPTV Application servers 112, being the central point of the IPTV service, manage all IPTV-specific functions not provided through IMS interfaces, and are connected to content providers 113. Each IPTV application server interfaces with the IMS core and functions provided by the service delivery platform.

The common IMS system includes the IMS core 114, comprising Call Session control Functions (CSCF's) 115, the Home Subscriber Server (HSS) 116 and IMS enablers 117. The IMS core provides a control layer that controls services provided over fixed and mobile access networks. The Call Session control Function (CSCF), which is the central control point in IMS, provides SIP routing services and enforces Authentication and Authorization (AA). The HSS generally stores and provides user data in IMS. Additional complexity may be contained in additional databases. The most relevant IMS enablers for personalized TV service are the Presence and Group Management (PGM), and the IMS messaging (IMSM).

The Service Delivery Platform (SDP) provides a variety of support functions that can be shared along different types of services. The support functions comprises service provider support functions, such as different charging models (Charging) 118, Operation and Maintenance (O&M) 119 support functions and content related support functions, such as Electronic Service Guides (ESG) 120. ESGs provide information about available services and contain an electronic program guide that enables viewers to navigate, discover, and select programs and content by time, title, channel and genre.

A problem with existing solutions is that information collection associated with a user using a service is often done automatically, without actively involving the user. The user might even be unaware of the information collection taking place during the execution of a service. This kind of information collection does not encourage the user to update and to reuse the stored information for e.g. personalization purposes.

Another problem is that information collection is also often limited to Internet searches and ordering, while other activities which are associated with the human behaviour are not captured.

In addition, it is not always appropriate that immediate actions are triggered upon having collected information from a scanned code or a read RFID tag. This problem raises the question of how to enable updating of information related to a certain activity, and a triggering of said activity, so that the activities can be scheduled in various different ways on the basis of personalized information stored and processed over time.

Yet another problem with presently used systems is how to execute personalized interaction of individual users, e.g. when different family members are watching content displayed on a shared device, such as a TV. Today this type of problem entails the use of an active login procedure for each family member, wherein each family member may authorize oneself by entering a secret PIN code to a shared TV remote control. This approach does neither provide for a flexible method for updating of user preferences, nor does it encourage user personalization associated with individual user interactivity.

SUMMARY

The object of the present invention is to address at least some of the problems outlined above. In particular, it is an object to provide personalized services for users having registered a media player in a multimedia network, such as IMS. This object and other are obtained by providing a method and an application server for providing personalized service instructions on the basis of information retrieved from a code, e.g. a colorcode, a QR-code or an RFID-tag.

In a first embodiment, a media player, e.g. a mobile telephone, is used for creating or updating personal data stored in a preference database. A user may request for a service from a second media player, wherein the personal data, stored in the preference database is used for the personalization.

A first user which has registered a first media player (UE A) to a multimedia network with a first identity (ID_1), reads a code using a visual interface, integrated with or connected to the first media player. The code is decoded in the media player and a user preference message, comprising the content of the code and at least one identity, is created by an application of the media player, and forwarded to an application server, adapted to provide personalized services according to the claimed invention. In the application server, one user preference data record for each identity of the user preference message is created, or, if already existing, updated, on the basis of the content of the user preference message. A user wanting to activate a personalized service, sends a service request, comprising a request for a personalized service and the first identity, is received from a second, registered media player (UE B). In the application server, the user preference data record is retrieved from the preference database. On the basis of the content of the service request and the content of the user preference data record, the application server is requesting for a personalization message, comprising personalized instructions on the service, from a content database. The personalization message is then sent to the second media player for execution of the requested service.

In a second embodiment, a first media player, e.g. a mobile telephone, registered in a multimedia network with a first identity, is used for interacting with a service displayed on second media player, e.g. a set-top-box/TV.

A request for a personalized service is sent from a second media player (UE B) to an application server. In case of a unicast service distribution, service specific content, associated with the requested service, and a second user identity, with which the second media player has been registered, is encoded into a code and forwarded to the second media player where it is displayed. In case of a multicast service delivery, however, only content specific data is forwarded to the second media player, where a colorcode, comprising the content specific data, encoded with the second identity (group_ID), is presented on the second media player.

A user may interact with the service by reading the code via a visual interface of a first media player (UE A). The content of the code is then decoded by an application adapted therefore and a user preference message, comprising the content of the code and a first identity (ID_1), to which the first media player is registered, is created and forwarded to the application server. This action may be followed by additional interactions between the first media player and the application server. Upon termination of the interaction, user preference data records, associated with, and linked to by the first identity and the second identity are then created, or, if already existing, updated in a preference database.

In a next step a personalized feedback message is created, according to the respective user preference data record and the content associated with the service request. The personalized feedback message is then forwarded to the first media player for invoking an application, adapted to execute the requested service. Depending on the selected service, the forwarded personalized feedback message may also trigger one or more additional interactions between the first user device and the application server, resulting in the creation and forwarding of an additional personalized feedback message to the first media player and/or to the second media player for a continuous, interactive service execution.

In a third embodiment, a first user, having a first media player wants to get access to presence information of a second user, having a second media player, and a code, e.g. a colorcode, comprising a personal identity. By reading the code, the first user may initiate a process for updating of a personal group-list, and for accessing the presence information of the second user.

A code, comprising a second identity of a second media player, registered in a multimedia network, is read via a visual interface of a first media player, registered in the multimedia network with a first identity. The code is decoded in the first media player and a user preference message, comprising the first and the second identity, representing a request for presence information associated with said second media player, is created and forwarded to the application server. At the application server a group-list is created or, if already existing, updated in the user preference data record linked to by the first identity.

For security reasons, the first user requests for authorization to access presence information of the second user from the second media player. Upon receiving a successful authorization, a subscription for the requested presence information may be initiated and the second media player is added to the group list.

The media players mentioned in this document may be any type of devices adapted for executing personalised services according to any of the embodiments described above, such as e.g. a mobile device, a PC, a laptop, a set-top-box connected to a TV or a PDA. The multimedia network, suitable for providing personalization of services according to any of the described embodiments, may be any type of network having the capabilities of handling the described signalling and of handling coded information, such as e.g. an IP Multimedia Subsystem (IMS).

The claimed invention also refers to an application server adapted to provide a personalized multimedia service to a user, having registered at least one media player in a multimedia network.

The application server comprises a communication means, adapted to communicate with a media player, registered in the multimedia network via at least one identity. The communication means of the application server also is adapted to communicated with a preference database, comprising personalization content, associated with the registered media player. The personalization content is stored in a user preference data record, and the identity is linking the media player to the record.

The application server also comprises a preference data controlling means, which is adapted to either create or update a user preference data record when a user preference message, comprising the content of a code read by said media player, and an identity, is received from the media player. If no user preference data record linked to by the identity already exists, a user preference data record is created on the basis of the content of the code. If, however, a user preference data record is linked to by the identity, that user preference data record is updated on the basis of the content of the code.

The application server is also adapted to communicate with one or more content providers, comprising service specific data. A content provider may be defined as a content database, comprising service specific instructions, or a dedicated server, such as, e.g. a presence server.

A service controlling means of the application server is adapted to create personalized instructions on the basis of a service request received from a registered media player, the content of the user preference data record, and data retrieved from a content provider. The service controlling means finally forwards the created instructions to the media player, where the instructions may invoke a specific application.

A preference database according to any of the described embodiments may be distributed from, or integrated with the application server to which it is connected.

DETAILED DESCRIPTION

Briefly described, the present invention provides a method and an application server for providing personalized services to a media player, registered in a multimedia network, on the basis of a the content of a code, read with a code reading entity attached to or integrated with a media player.

Figure 1:
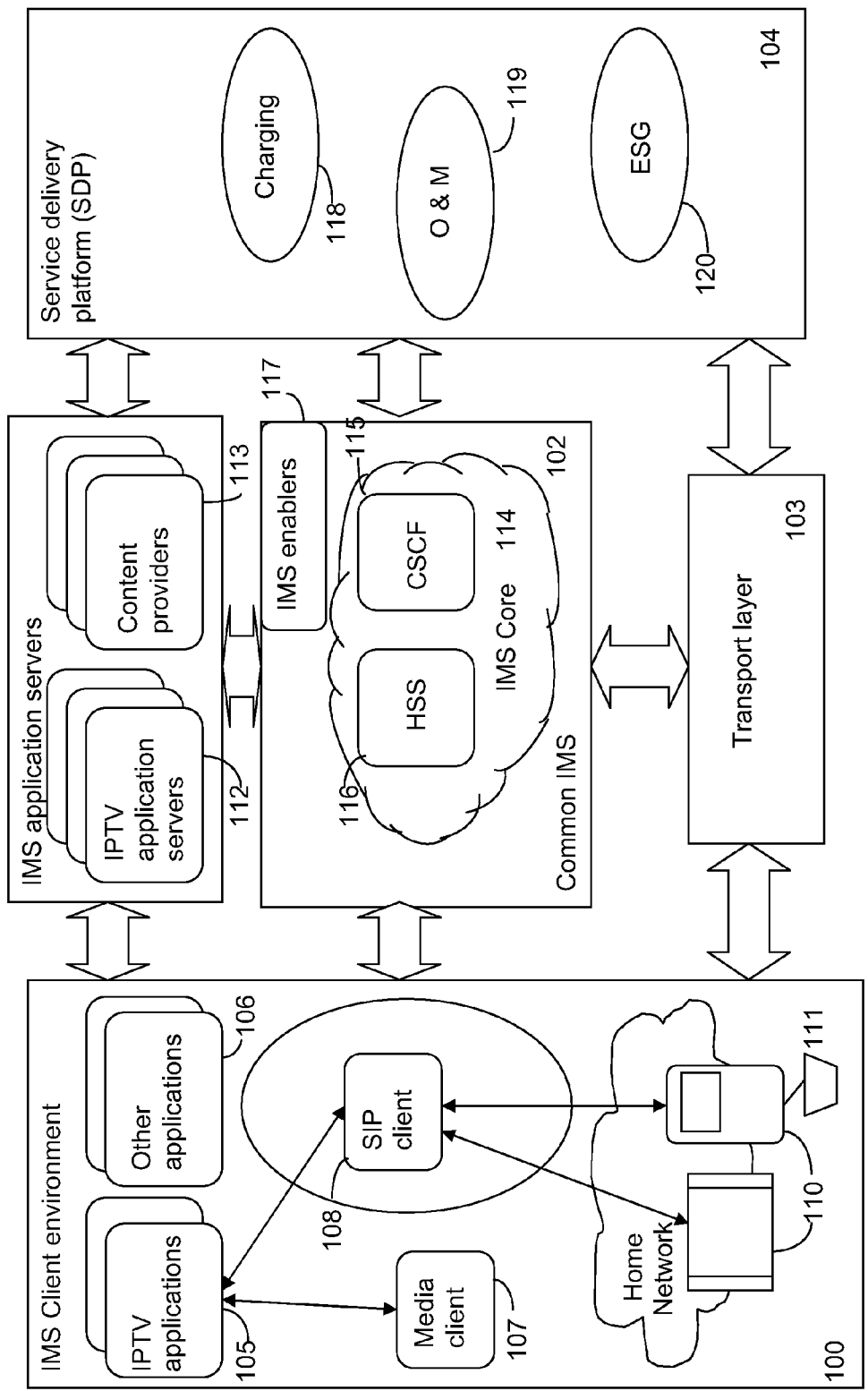
FIG. 1 is a block diagram schematically illustrating an IMS-based IPTV architecture for combined services and fixed-mobile convergence according to the prior art.
Figure 2:
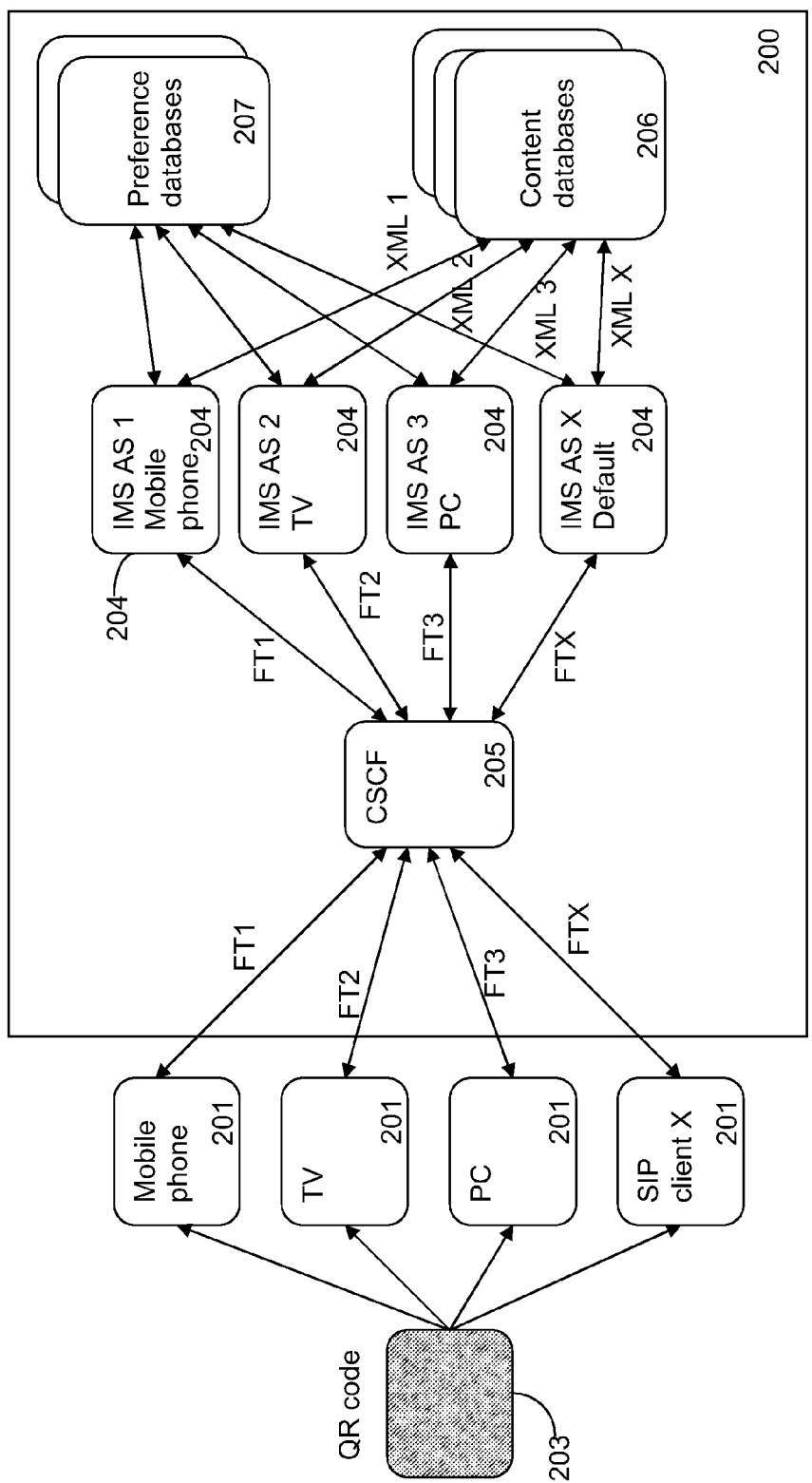
FIG. 2 is a block diagram schematically illustrating an IMS-based system which provides interactive services according to one embodiment.

A common IMS-based system 200 providing personalized services to media players 201 in accordance with one embodiment of the claimed invention is described in FIG. 2. Different types of media players, each comprising a SIP client (not shown), provide the media players access to the common IMS system. A media player adapted for interaction with the common IMS system may be any kind of electronic equipment suitable for hosting SIP client functionality, such as e.g. a mobile device, a set-top-box/TV (STB/TV), a PC or a PDA. Each media player may have one or more applications stored on a memory space, which are invoked by a personalization message, sent from an application server in response to a service request. The respective application may be invoked as a result from a communication between the media player and the application server, dedicated to provide a service requested, either from a media player, or from a content provider. A user of a media player who has the intention of personalizing a service, may initially read a code, carrying service specific information and/or one or more identities, via a code reading entity, e.g. a scanner or a camera. Each media player in the figure has means for reading and decoding a code 203, e.g. a QR-code, a colorcode or an RFID-tag.

When a code has been read, the media player establishes a connection with an IMS application server 204, via the CSCF of the IMS core. The IMS system illustrated in the figure comprises a number of IMS application servers, each adapted to service different types of media players. IMS application server 1, provides services to mobile telephones, IMS application server 2, provides television services, while IMS application server 3, provides services adapted for PC's, and a default server, IMS AS X, may provide services to other types of specially adapted media players. Via the IMS core, one of the IMS application servers (204, IMS AS 1-X), responsible for a requested service is addressed, wherein the content of the code, together with a personal identity to which the respective media player has been registered, is decoded and forwarded to the respective IMS application server. The IMS application server creates a user preference data record, which is stored in a preference database (207). The preference database may be located in the IMS core or at the content provider premises, depending on e.g. the business model and the O&D structure chosen by the respective service provider. The preference database, will be further described below with reference to FIG. 6.

The IMS application server also have access to one or more content providers 206, comprising service specific content, to be used when setting up personalized instructions to a media player from which a personalized service, e.g. specified advertisements. The content provider may also be accessed from the IMS application server, upon receiving a request for a personalized service from a media player.

A personalized service may be actively requested by a user of media player, or triggered by a predetermined, condition such as time of day. According to one embodiment of the invention, a request for a service is sent from a media player as a SIP message, comprising a feature tag, specifying instructions associated with the requested service. In case no feature tag is attached to the SIP message, a default instruction may be attached to the body of the SIP message. Upon receiving the SIP message, including a feature tag or a default instruction by an IMS application server adapted to distribute the requested service, the IMS application server requests for information from the respective user preference data record, stored in the preference database. Depending on the content of the service request and the content of the user preference data record, relevant content, sent from a content provider is assembled, forming a personalization message by an application in the IMS application server. The content retrieved from the content provider may have the form of an Extensible Markup Language XML. The IMS application server attaches a feature tag (FT1-FTX), corresponding to the service request, to the XML. The message, now comprising an XML and a feature tag, is then forwarded to the respective media player for which the requested service is intended, and a personalized service is delivered to the media player.

A strolling user may come across a product he or she finds interesting. By reading a QR-code, comprising a product identity, which is attached to the product, with a QR-code reader, attached to or integrated with the IMS registered media player, the content retrieved with the QR-code reader triggers a procedure for creating or updating a user preference data record linked to, and associated with the personal IMS identity to which the media player is registered. The information retrieved from the QR-code described above may also be used for updating the user preference data record in such a way that the user preference data record is modified according to the behaviour of the user of the media player. By linking each user to a specific user preference data record by the identity of the user, a media player may be shared by a plurality of users. Each user, wanting to personalize a service may register the media player using a personal identity. This identity will then be linking the user to a dedicated user preference data record, in which personalized data, associated with that user is stored and updated.

How the user preferences, read from a code, is effecting the content retrieved from the content provider, is not the scope of the claimed invention and, thus, this process will not be described any further in this document.

Figure 3:
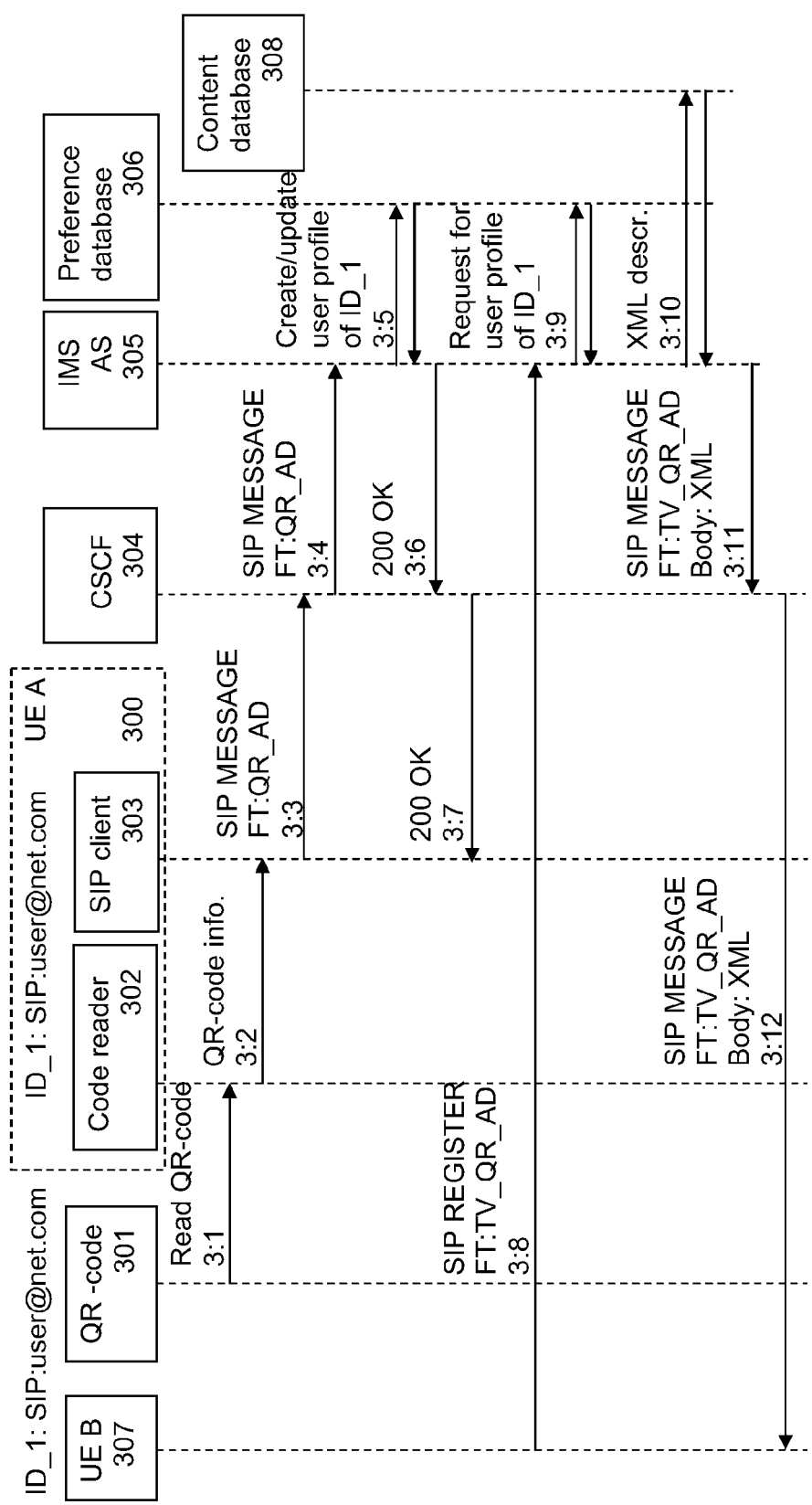
FIG. 3 is a signalling diagram where a user registered in an IMS network subscribes to an interactive, personalized service and wherein the personalization is dependent on information previously retrieved from a QR-code, according to another embodiment.

A signalling procedure illustrating one embodiment of the claimed invention where a user, having registered a media player in an IMS network, subscribes to an interactive, personalized service, will now be described with reference to the signalling diagram in FIG. 3. In the figure, a first media player, UE A 300, e.g. a mobile terminal, is registered to a personal IMS identity (ID_1), e.g. SIP:user@net.com. In a first step 3:1, the user reads a QR-code 301 with an integrated or attached code reader 302, wherein an application is decoding the content of the QR-code and creates a message, comprising the content of the QR-code and ID_1 in step 3:2. In UE A, A SIP client 303 initiates a communication with the IMS network (IMS core), via CSCF 304, by creating a user preference message, using a SIP MESSAGE method with a feature tag, QR_AD, for transmission of the content of the QR-code and ID_1 to CSCF in step 3:3, and further to an IMS application server 305 in step 3:4. Upon receiving the scanned information at the IMS application server, a user preference data record linked to by ID_1, is created in a preference database 306 in step 3:5, or if already existing, relevant parts of the user preference data record is updated according to the content of the received user preference message. The creating/updating process is verified with a 200 OK message sent to CSCF in step 3:6, and terminated in UE A in step 3:7.

A user wanting to receive personalized services via another media player, UE B 307, i.e. an STB/TV, which depends on the information earlier retrieved from the QR-code, may request for a personalized service upon having registered UE B to IMS. By registering UE B to the same personal IMS identity as UE A, i.e. SIP:user@net.com, both media players will be linked to the same user preference data record. By forwarding the service request, comprising specific instructions within a feature tag, from UE B, to the IMS application server, the user instructs the IMS application server to deliver personalized services to the TV-screen of UE B. This instruction could for example indicate the desire to receive a certain category of advertisements on the families TV screen at certain, predefined occasions. The message is assembled as an SIP REGISTER message and the requested service is specified by the attached feature tag, TV_QR_AD. In step 3:8 the message is sent to the IMS application server. The IMS application server receiving the service request from UE B, requests for the user preference data record linked to by personal ID_1 in step 3:9, from a preference database. Next, in step 3:10, the IMS application server requests for service specific instructions, e.g. XML instructions, from a content database 308. In the requesting IMS application server, a SIP MESSAGE, forming a personalization message, comprising the feature tag, TV_QR_AD and an XML description, adapted according to the content of the respective preference data record and the service request, is assembled. In step 3:11, the personalization message is sent to CSCF, and in step 3:12 it is forwarded to UE B. In UE B, an application interprets the received personalization message and the requested service is executed in a personalized manner.

In a home with a media player, i.e. an STB/TV, which is registered to IMS via a family IMS identity (a group IMS identity), several individuals, e.g. family members, may share the same STB/TV. A plurality of the family members may also have individual media players, e.g. mobile telephones, each being registered to IMS via different individual personal IMS identities. In order to be able to simultaneously provide personalized services to a plurality of users wherein content is displayed on a shared device, e.g. a TV screen, and in order to provide automatic creation/updating of individual, as well as group user preferences, stored in the respective user preference data record, an alternative embodiment will be required. Such an alternative embodiment will now be described with reference to FIG. 4.

Figure 4:
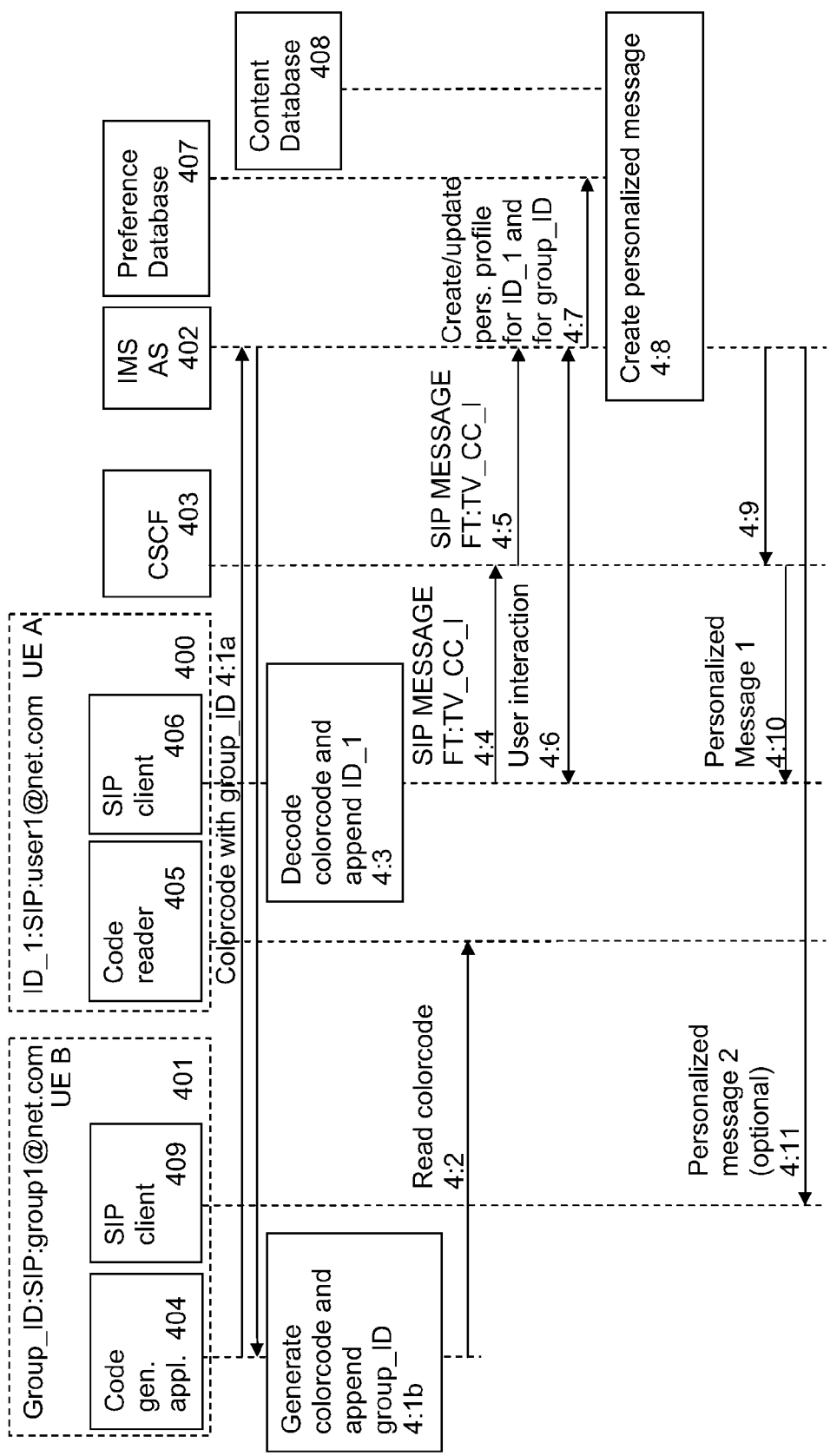
FIG. 4, is another signalling diagram where interactive, personalized services are provided both to an individual user and to a group of users, and where the services are personalized in dependence of information retrieved from a colorcode, according to yet another embodiment.

In the exemplary embodiment of FIG. 4, a first media player 400, e.g. a mobile terminal, denoted UE A, and a second media player 401, e.g. an STB/TV, denoted UE B, are both registered to IMS, linking the respective media player to a respective user preference data record via a group IMS identity, i.e. SIP:group1@net.com, for UE B, and an individual IMS identity, i.e. SIP:user1@net.com for UE A. A plurality of additional media players could be registered to individual IMS identities as well, and, thus, personalized services could be provided for additional users. A user selects a service, e.g. a TV show, by inputting instructions into UE B, which are forwarded to a dedicated IMS application server 402, via CSCF 403.

In case of a unicast service distribution, where the group IMS identity, to which UE B is registered, is included in the service request, a colorcode, carrying both content specific information and the group IMS identity, is generated by an IMS application server, capable of providing said service. The colorcode is forwarded to UE B in an initial step 4:1a, and presented on the display of UE B.

In case of a multicast service delivery scenario, however, only the content specific data is sent to UE B by the respective IMS application server for presentation on the TV screen. For a multicast service delivery, the colorcode itself is generated by an IPTV code generating application 404 in UE B, where the group IMS identity, to which UE B is registered also is encoded into the colorcode in an alternative step 4:1b.

The colorcode, displayed on the TV screen, will now comprise content specific information, i.e. voting information, which is associated with the respective show on display. Via a visual interface, e.g. a camera, which is integrated with, or attached to UE A, the colorcode is registered in by a code reading application 405 in step 4:2. In step 4:3, a SIP Client 406 in UE A decodes the colorcode, and forms a user preference message, containing the code specific information and the personal IMS identity, ID_1. Upon terminating the interaction with the record, a feature tag, TV_CC_1, is attached to the user preference message, forming a SIP MESSAGE, which is forwarded to CSCF in step 4:4. In step 4:5, the message is forwarded to the IMS application server. The graphic user interface (GUI) of UE A also enables the user to interact with IMS application server. This optional interaction, which may result in a varying number of messages sent between UE A and the IMS application server, is illustrated with step 4:6. Such an interaction may introduce additional personalization of a particular service. In the IMS application server, both the personal IMS identity and the group IMS identity are extracted during the interaction. Depending on the result from the interaction, the relevant sections of one or both of the user preference data records, linked to by the respective IMS identities, are updated in step 4:7, accessing the respective records from a preference database 407. If no preference data record linked to by the respective identity already exists, such a record is instead created upon receiving the user preference message.

In the IMS application server, the content of the respective one or both user preference data records triggers an application to create a personalization message in step 4:8, wherein relevant service specific content is retrieved from a content database 408. The personalization message is forwarded to CSCF in step 4:9, and to UE A in step 4:10, where the SIP client of UE A is triggering an application to execute the requested, personalized service.

Optionally, the personalized service could involve also UE B, registered with the group IMS identity. Such a personalization message, which is forwarded to UE B in a final, optional, step 4:11 may comprise the same information as the one sent to UE A, or it may comprise information according to another configuration, depending on the content of the user preference data record associated with the group IMS identity. In UE B SIP, client 409 of UE B is triggering an application to execute the requested service, according to the received personalization message.

If a service involving a business transaction is chosen from any of the registered media players, additional steps may be required. Such an interaction may e.g. enable interconnection between the respective media player and a third party business application.

In yet another embodiment, which will now be described with reference to FIG. 5, the content of a read code, e.g. a color code 500, may give a first user A, using a media player (UE A) 501, access to presence information of a second user, B, using a second media player (UE B) 502, wherein both media players are registered to IMS. UE A is registered to ID_A, e.g. SIP:userA@net.com, and UE B is registered to ID_B, e.g. SIP:userB@net.com. The colorcode, being attached to user B, comprising user B's user identity, ID_A, is read by a code reader 503, e.g. a scanner, by user A in a first step 5:1. In step 5:2, the read content is decoded by a decoding application, stored in UE A, and ID_A is appended to the colorcode. A SIP message, SIP MESSAGE FT:GLM_AS, comprising a feature tag, is then formed by the SIP client 504 in UE A. The SIP MESSAGE is forwarded to CSCF 405 in step 5:3, and to the respective IMS application server 406 in step 5:4. At the IMS application server, an existing group-list is to by ID_A and stored in a preference data record in a preference database (not shown), which may be distributed from, or integrated with the IMS application server, is updated with data related to user B (ID_B) in step 5:5. Next, a notification is sent as a 200 OK message to CSCF in step 5:6, and to UE A in a next step 5:7. Before user A get access to user B's presence information, an authorisation request has to be approved by user B. Such an authorisation is executed in step 5:8, involving the SIP client of UE A and of UE B 507. When authorised, user A will have access to user B's presence information, by way of accessing a presence server 508, which is illustrated with step 5:9.

An IMS application server adapted to provide personalized services to users according to one embodiment of the claimed invention will now be described with reference to FIG. 6.

Figure 6:
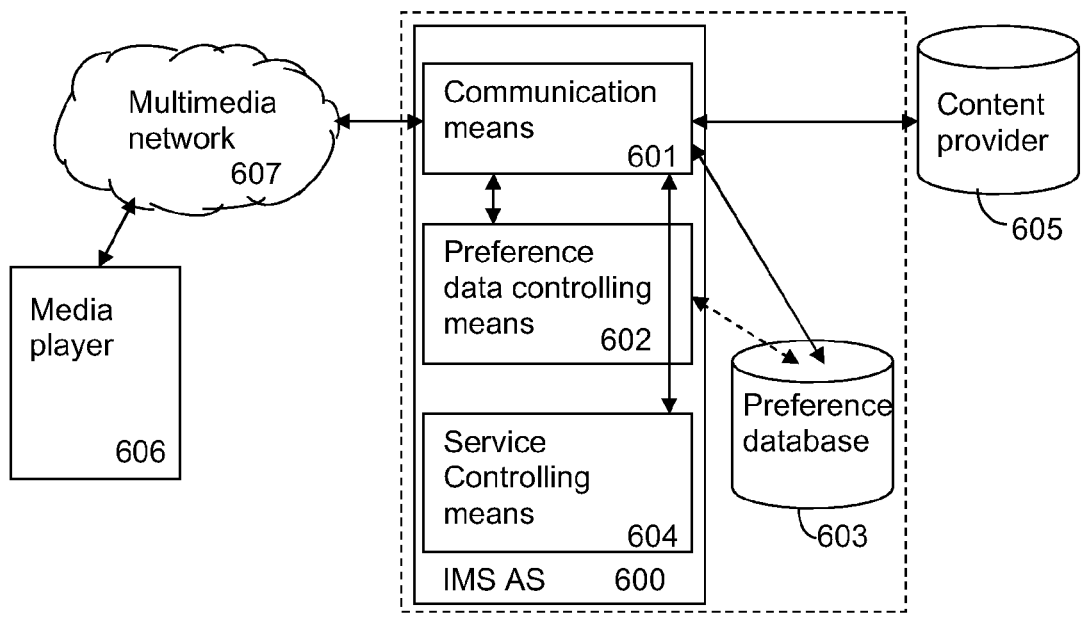
FIG. 6 is a block diagram, schematically illustrating an application server adapted to create and update user preference data records, and to provide personalized services to users.

An IMS application server 600 adapted to provide personalized multimedia services to users registered in a multimedia network (607) according to one of the embodiments described in this document is schematically illustrated in FIG. 6. A user preference message, comprising content retrieved from a code and at least one identity, is received by a communication means 601 of the IMS application server. The communication means is communicating with one or more preference databases 603, in which personalization content is stored in a user preference data record. The identity with which a media player (606) has been registered is linking the user preference message to the respective user preference data record. The communication means also is in connection with one or more content databases, from which service related information may be retrieved, for setting-up a personalized instruction, i.e. a personalization message, to be used for personalizing a service. Alternatively, the IMS application server may access a dedicated server, such as e.g. a presence server, from which service specific information, associated with the respective requested service may be retrieved.

The content of the user preference message is forwarded to a preference data controlling means 602, adapted to create a user preference data record associated with, and linked to by the identity, included in the user preference message. The content of the created user preference data record will be based on the content of the code. If a preference data record already exists, the preference data controlling means is instead adapted to update the respective record on the basis of the content of the code. The IMS application server have access to one or more preference databases 603, wherein the user preference data records are stored. As illustrated with the dotted box, the preference database may be integrated with the IMS application server.

The solid box illustrates another alternative architecture wherein the preference database is distributed from the application server.

In an alternative embodiment, illustrated with a dotted arrow, the preference data controlling means may be in direct contact with the preference database, instead of being connected via the communication means.

According to one embodiment, a request for a personalized service, received by communication means, 601, is forwarded to a service controlling means 604, adapted to personalize the requested service on the basis of the service request, the content of the user preference data linked to by the identity of the request, and data retrieved from a connected content provider 605. The content provider may be a content database, comprising service specific instructions, or a dedicated server, such as e.g. a presence server. A dedicated server may initiate a personalized service according to pre-determined rules such as, e.g. time if the day, and, thus, will under certain circumstances be able to act in a manner similar to a registered media player. By taking the content retrieved from the service request, the respective preference data record, and the content from the content provider into consideration, according to certain applications of the service controlling means, personalized instructions in the form of a personalized message is assembled and forwarded to the communication means for further distribution to the requesting media player.

Figure 7:
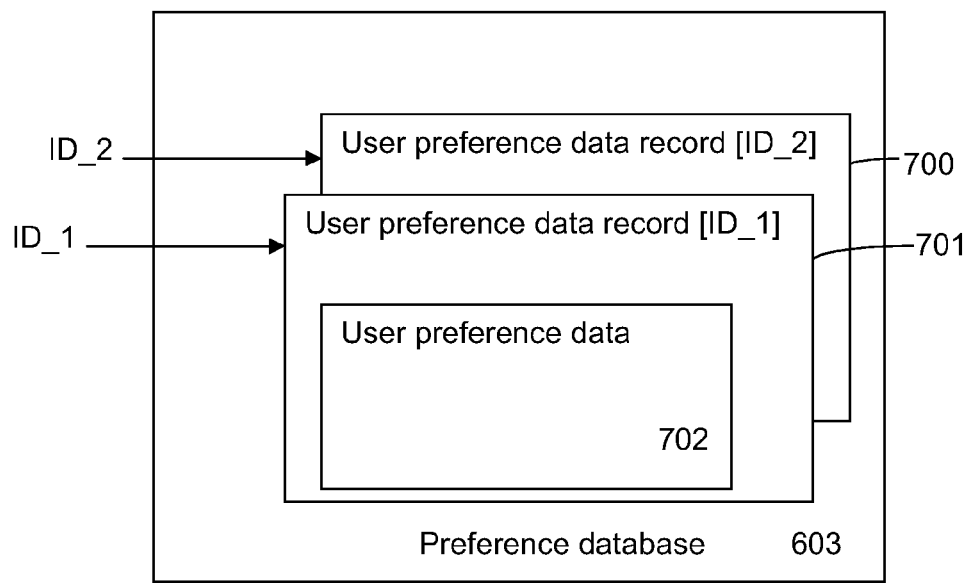
FIG. 7 is a schematically illustration of user preference data records, each being linked to by a user identity.

FIG. 7 schematically illustrates the content of a preference database 603. One or more preference databases, may be accessed from the IMS application servers of the IMS network according to any of the embodiments proposed in this document. When a preference message, comprising content read from a code and a previously unknown identity (ID_1, ID_2), is received by an IMS application server, a user preference data record (700,701) is created by means of the IMS application server. If, however, a link to a user preference data record already exists, relevant content of the user preference data record is updated in the preference database. Each user preference data record may comprise user preference data (702), represented by trigger rules set by certain feature tags. The rules stored in the user preference data records may be triggered upon receiving a service request or may be triggered automatically to deliver a personalized service to a media player registered with a user identity according to a predetermined rule such as i.e. on a specified time of the day.

While the present invention has been described with reference to exemplary embodiments, the description is generally only intended to illustrate the inventive concept and should not be taken as limiting the scope of the invention, which is defined by the appended claims.

The invention claimed is:

1. A method, executed in an application server, of personalizing a multimedia service for a first user, wherein said first user has registered a first media player in a multimedia network, comprising the following steps:
   receiving, from the first media player, a first user preference message, comprising a content of a code and at least one identity,
      wherein said code has been displayed on a second media player, decoded, registered with a second identity and read by said first media player via a visual interface of the first media player, and
      wherein said at least one identity is a first identity, with which said first media player is registered, and said second identity, wherein said first identity is an individual identity and said second identity is a group entity,
   creating or updating at least one user preference data record, each linked to by one of said at least one identity, on a basis of said content of said code, and
   personalizing said multimedia service, according to one of said at least one user preference data record linked to by one of said at least one identity.

2. The method according to claim 1, wherein:
   in said creating or updating step, a first user preference data record, linked to by said first identity, is stored in a preference database.

3. The method according to claim 2, wherein said personalizing step comprises the further steps:
   receiving a service request from the second media player, registered with said first identity, wherein said service request comprises a request for a personalized service and said first identity,
   requesting said first user preference data record from said preference database,
   requesting service specific instructions from a content database,
   creating, on a basis of a content of said service request, said content of said first user preference data record and said service specific instructions, a personalization message, and
   forwarding said personalization message to said second media player for execution of said personalized service.

4. The method according to claim 1, wherein prior to said receiving step the following steps are executed:
   requesting from said second media player for a personalized service,
   encoding service specific content, associated with said personalized service, and said second identity into a code, capable of providing said personalized service, and
   forwarding said code to said second media player.

5. The method according to claim 1, wherein prior to said receiving step, the following steps are executed:
   requesting from said second media player for a personalized service, and,
   forwarding service specific content, associated with said personalized service, from said application server, capable of providing said personalized service, to said second media player, where said service specific content is encoded into a code together with said second identity.

6. The method according to claim 4, wherein:
in said receiving step, after receiving said first user preference message, said first user is interacting with said service specific content associated with said personalized service in said application server, via a user interface of said first media player.

7. The method according to claim 5, wherein:
said creating or updating comprises creating or updating said at least one user preference data record associated with said first and said second identity.

8. The method according to claim 7, comprising the further steps:
creating a personalized feedback message according to said at least one user preference data record, and said service specific content associated with said personalized service, and,
forwarding said personalized feedback message to said first media player for invoking an application, triggered by said personalized service.

9. The method according to claim 8, wherein said personalized feedback message triggers at least one interaction between said first user and said application server, and wherein said at least one interaction results in a creation and forwarding of another personalized feedback message to said first media player for a continuous, interactive service execution.

10. The method according to claim 9, comprising the further step:
creating an additional personalized feedback message in accordance with a result from said at least one interaction, and forwarding said additional personalized feedback message to said second media player for execution of said personalized service.

11. The method according to claim 1 wherein:
in said receiving step, said user preference message is a request for presence information associated with said second media player, and,
in said creating or updating step, said creating or updating comprises creating or updating a group-list in said at least one user preference data record, linked to by said first identity.

12. The method according to claim 11, comprising the following further steps:
requesting from said first user authorization to access said presence information associated with said second media player, and
upon receiving a successful authorization, initiating a subscription for said presence information and adding said second media player to said group-list.

13. The method according to claim 1, wherein said first media player is any of a mobile device, a personal computer, a laptop, a set-top-box/television or a personal digital assistant.

14. The method according to claim 1, wherein said second media player is any of a mobile device, a personal computer, a laptop, a set-top-box/television or a personal digital assistant.

15. The method according to claim 1, wherein said visual interface is attached to a first user interface.

16. The method according to claim 1, wherein said visual interface is integrated with a first user interface.

17. The method according to any claim 1, wherein said multimedia network is Internet protocol Multimedia Subsystem.

18. An application server in a multimedia network, for providing a personalized multimedia service to a user having registered at least one media player in said multimedia network, said server comprising:
communication means for communicating with:
a first media player, registered in said multimedia network via at least one identity, wherein said at least one identity is a first identity, with which said first media player is registered, and a second identity, wherein said first identity is an individual identity and said second identity is a group entity, and,
at least one preference database, comprising personalization content associated with said first media player, said personalization content being stored in a user preference data record, and wherein said user preference data record is linked to by one of said at least one identity, and,
preference data controlling means for performing either of the following steps upon receiving a first user preference message from and created by said first media player, comprising a content of a code and at least one identity, wherein said code has been displayed on a second media player, decoded registered with the second identity and read by said first media player:
create a user preference data record on a basis of said content of said code if no preference data record linked to by said at least one identity already exists, or,
update a user preference data record on said basis of said content of said code if said user preference data record linked to by said at least one identity already exists.

19. The application server according to claim 18, wherein said communication means further communicates with at least one content provider, comprising service specific data and wherein said application server further comprises:
service controlling means to:
create personalized instructions on a basis of a service request received from a registered media player, a content of said user preference data record, and data retrieved from said at least one content provider,
forward said personalized instructions to said first media player.

20. The application server according to claim 18, wherein said at least one preference database is distributed.

21. The application server according to claim 18, wherein said at least one preference database is integrated with said application server.

22. The application server according to claim 19, wherein said at least one content provider is a content database.

23. The application server according to claim 19, wherein said at least one content provider is a presence server.

24. The application server according to claim 19, wherein said personalized instructions invoke an application in said first media player.

* * * * *

UNITED STATES PATENT AND TRADEMARK OFFICE
CERTIFICATE OF CORRECTION

| | | |
|---|---|---|
| PATENT NO. | : 8,671,440 B2 | Page 1 of 1 |
| APPLICATION NO. | : 12/530355 | |
| DATED | : March 11, 2014 | |
| INVENTOR(S) | : Damola et al. | |

It is certified that error appears in the above-identified patent and that said Letters Patent is hereby corrected as shown below:

In the Drawings

Figure 5:
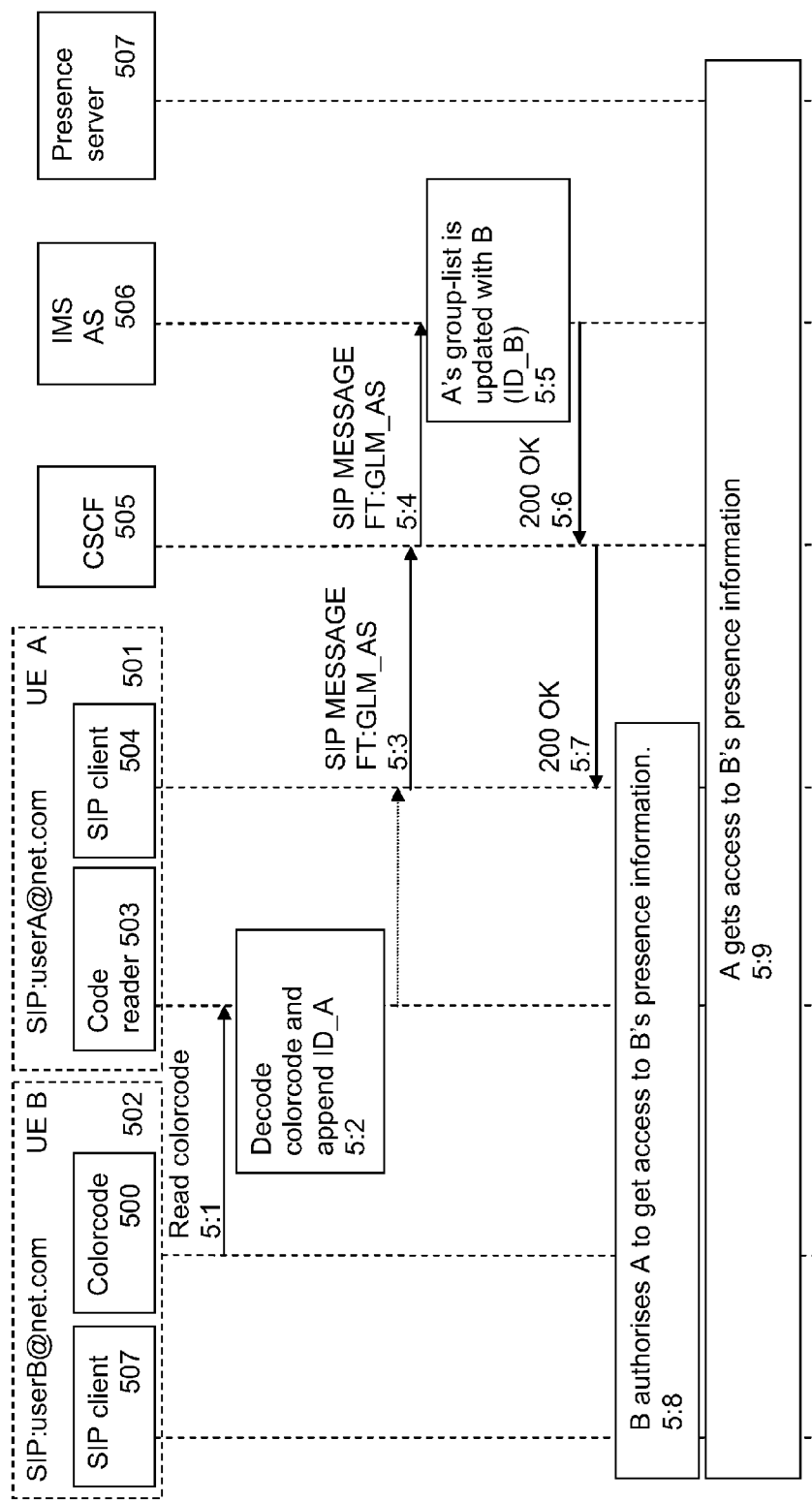
FIG. 5 is another signalling diagram, illustrating how a first user registered in an IMS network can add a second IMS registered user to a group-list in order to get access to the second users presence information, wherein the second user is identified from a colorcode, according to another embodiment.

In Fig. 5, Sheet 5 of 6, delete " 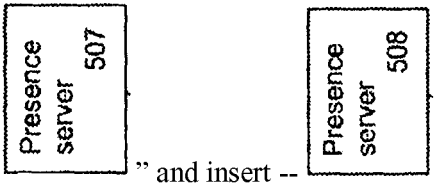 " and insert -- -- , therefor.

In the Specification

In Column 3, Line 19, delete "along" and insert -- among --, therefor.

In Column 5, Lines 44-45, delete "to communicated" and insert -- to communicate --, therefor.

In Column 6, Line 23, delete "FIG. 4," and insert -- FIG. 4 --, therefor.

In Column 10, Line 41, delete "CSCF 405" and insert -- CSCF 505 --, therefor.

In Column 10, Line 42, delete "IMS application server 406" and
insert -- IMS application server 506 --, therefor.

In the Claims

In Column 13, Line 34, in Claim 11, delete "claim 1" and insert -- claim 1, --, therefor.

In Column 14, Line 1, in Claim 17, delete "to any" and insert -- to --, therefor.

Signed and Sealed this
Fifteenth Day of July, 2014

Michelle K. Lee
*Deputy Director of the United States Patent and Trademark Office*